J. ROHRHEIMER.
NUT LOCK.
APPLICATION FILED AUG. 1, 1916.
1,219,780.
Patented Mar. 20, 1917.
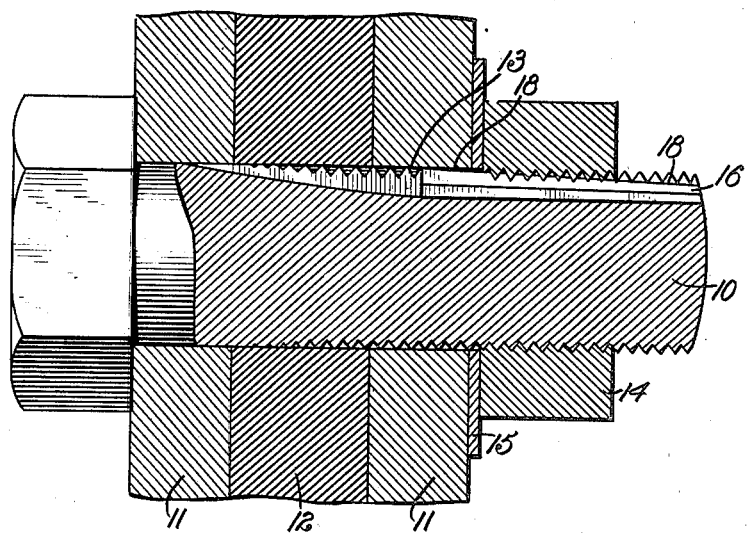
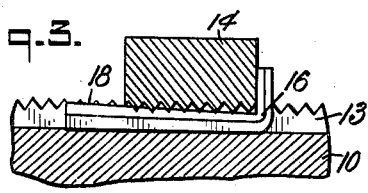
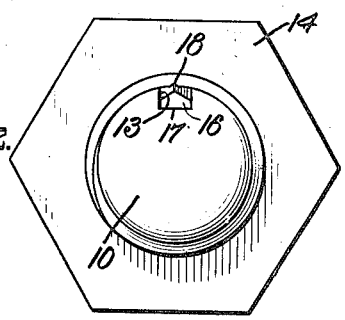
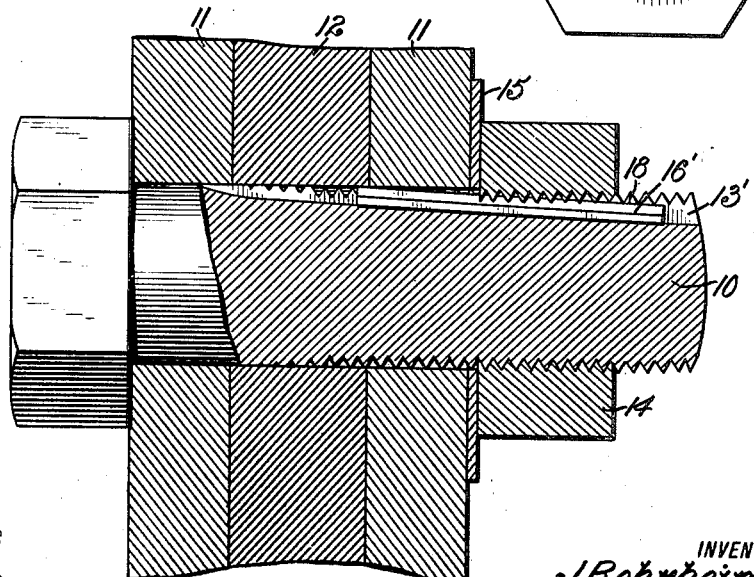
WITNESSES
INVENTOR
J. Rohrheimer
BY
ATTORNEYS

UNITED STATES PATENT OFFICE.

JOSEPH ROHRHEIMER, OF SHAMOKIN, PENNSYLVANIA.

NUT-LOCK.

1,219,780.          Specification of Letters Patent.          Patented Mar. 20, 1917.

Application filed August 1, 1916. Serial No. 112,512.

*To all whom it may concern:*

Be it known that I, JOSEPH ROHRHEIMER, a citizen of the United States, and a resident of Shamokin, in the county of Northumberland and State of Pennsylvania, have invented a new and Improved Nut-Lock, of which the following is a full, clear, and exact description.

This invention relates to nut or bolt locks and has particular reference to means for locking a nut in place upon a bolt by means of a specially disposed key.

Among the objects of the invention is to provide a nut lock of the simplest form for providing for efficiency in the locking of the nut with the least amount of trouble and expense.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a vertical longitudinal section of a bolt with a nut applied thereto and indicating one form of my locking device;

Fig. 2 is an end elevation of the same looking toward the left in Fig. 1;

Fig. 3 is a fragmentary view of the same parts as are shown in Fig. 1, but with the end of the key bent upwardly; and Fig. 4 is a vertical longitudinal section of a modified form of the locking device.

Referring now more particularly to the drawings, I show a bolt 10 similar to bolts commonly used for securing fish plates 11 to railway rails 12. The bolt is or may be of usual construction in every respect, except that it is provided with a longitudinal groove 13 extending along one side of the bolt and intersecting the threads thereof. The depth of the groove is greater than that of the threads and, as shown in Figs. 1 and 3, the groove may be of uniform depth having its bottom parallel to the axis of the bolt.

The nut 14 is of common form being provided with an internal thread adapted to coöperate directly with the threads of the bolt. Any suitable number of washers 15 may be applied between the nut and the adjacent fish plate 11 to establish proper coöperation between the nut, the locking means, and the parts to be clamped.

In the groove 13 I locate a key 16 of peculiar form and adapted to coöperate with the common form of nut in a peculiar manner. As shown in Figs. 1 and 3, the key is tapered toward its outer end and is provided with a flat bottom 17 adapted to fit squarely against the bottom of the groove 13. It will also have flat vertical sides to fit substantially snugly against the sides of the groove, but as to the special form in cross section of the base or body of the key, I do not wish to be unnecessarily limited. The top of the key or outer side thereof is provided with a longitudinal angular edge 18. The location of this edge 18, which is preferably straight, with respect to the coöperating threads of the bolt and nut, is such that when the key is slipped into the groove preparatory to applying the nut, said sharp edge of the key will intersect the threads of the bolt along the part where the nut is to be applied. The edge is arranged at an angle to the axis of the bolt and is so disposed that it will intersect the threads of the bolt nearer their points or outer edges as they approach the washer or parts to be clamped by the nut. At the point, however, where the nut first passes over the key the edge 18 lies below the roots of the bolt threads. Any suitable metal may be employed for making the keys, but I prefer for this purpose, a metal somewhat softer than the nut.

With the key disposed as above stated and the parts assembled ready for clamping, the nut will be screwed upon the outer end of the bolt in the usual manner, being drawn toward the parts to be clamped by virtue of the spirality of the threads as usual. When the nut passes over that part of the edge of the key which intersects the bolt threads, the nut thread will cut a series of notches across the edge 18 of the key. The depth of the notches thus cut will depend upon several factors, among which may be noted the relative hardness of the key, as well as the height of the edge of the key with respect to the bolt threads. In any event, an enormous amount of friction is established by the cutting edges of the thread of the nut cutting into the angular edge of the key, causing also the thread of the nut to grip the threads of the bolt more tightly at every point of contact. To a certain extent, also, the action of the key may serve to bur or dull the cutting edge of the nut thread, thereby increasing the frictional contact between the nut and the uncut threads of the bolt. If it is desired to establish a positive lock for the nut for a permanent connection, the outer end of the key may be bent up squarely against the outer face of the nut, as shown in Fig. 3, but for all practical purposes this expedient is not essential.

As indicated in Fig. 4, it may be preferable in some instances to form the bolt groove 13′ with an inclined bottom for accommodation of a key 16′ of uniform cross section. The key 16′, however, is provided with the same outer longitudinal edge 18, which is adapted to occupy the same position with respect to the axis of the bolt and the nut and bolt threads, as has already been described.

As suggested in Fig. 1, one portion of the bolt groove may have its bottom horizontal or parallel to the axis of the bolt, while another portion thereof may be inclined. In other words, the opposite end portions of the groove may be different in character and cooperate with a key either tapered or of uniform cross section.

A locking device of the character described herein may be provided at exceedingly low cost, in addition to the ordinary cost of nuts and bolts. The grooves may be formed in the bolts by routing tools or the like in any suitable manner, and the keys whether tapered or uniform in cross section are of relative cheap construction.

I claim:

The combination with a bolt having a longitudinal groove intersecting the threads of the bolt and extending below the threads and a nut threaded for coöperation with the threaded end of the bolt, of a locking key having a body fitted into the bottom of the groove and held thereby from tilting, said key having along its outer side a sharp longitudinal edge inclined with respect to the axis of the bolt and intersecting the threads of the bolt at the place where the nut is to be applied when tight, the thread of the nut serving when the nut is being tightened to cut a series of transverse notches of gradually increasing depth into the edge of the key.

JOSEPH ROHRHEIMER.